United States Patent [19]
Vancini

[11] 3,778,980
[45] Dec. 18, 1973

[54] GAS DRYING APPARATUS

[75] Inventor: Carlo A. Vancini, Stamford, Conn.

[73] Assignee: Peabody Engineering Corporation, New York, N.Y.

[22] Filed: July 12, 1971

[21] Appl. No.: 161,664

[52] U.S. Cl................. 55/238, 55/416, 55/456, 261/79 A, 261/116
[51] Int. Cl............................................. B01d 47/16
[58] Field of Search.................. 55/235, 236, 237, 55/238, 260, 348, 416, 456, 457; 261/79 A, 114 R, 116

[56] References Cited
UNITED STATES PATENTS

| | | | |
|---|---|---|---|
| 1,746,218 | 2/1930 | Kamrath | 55/416 |
| 2,226,128 | 12/1940 | Harmon | 55/348 |
| 3,086,343 | 4/1963 | Stern | 55/456 |
| 3,109,870 | 11/1963 | Kuhn et al. | 261/114 R |
| 3,140,163 | 7/1964 | Hausberg | 55/416 |
| 3,225,522 | 12/1965 | Black | 261/116 |
| 3,304,694 | 2/1967 | Manger et al. | 55/238 |
| 3,345,046 | 10/1967 | Versluys et al. | 55/456 |
| 3,399,870 | 9/1968 | Zuiderweg et al. | 261/114 |
| 3,498,028 | 3/1970 | Trouw | 261/114 R |
| 3,605,388 | 9/1971 | Zuiderweg et al. | 261/114 R |
| 1,746,218 | 2/1930 | Kamrath | 55/416 |
| 2,226,128 | 12/1940 | Harmon | 55/348 X |
| 2,664,966 | 1/1954 | Moore | 55/456 X |
| 3,086,343 | 4/1963 | Stern | 55/456 |
| 3,216,182 | 11/1965 | Cochran et al. | 55/457 X |
| 3,329,130 | 7/1967 | Cochran | 55/457 X |
| 3,345,046 | 10/1967 | Versluys et al. | 261/79 |
| 3,526,081 | 9/1970 | Kusters | 55/127 |
| 3,603,062 | 9/1971 | Robbins et al. | 55/348 |

FOREIGN PATENTS OR APPLICATIONS 849,214  9/1960  Great Britain ........................ 55/396

Primary Examiner—Tim R. Miles
Assistant Examiner—Richard L. Chiesa
Attorney—Nathaniel L. Leek

[57] ABSTRACT

Apparatus for removing suspended matter from gases including a transverse baffle plate having openings for the passage of gases and separating units in said openings including a central pipe through which the gases pass and having vanes to cause rotation of the gas stream for the centrifugal separation of the suspended matter. A cap registers with said pipe having a central opening through which cleaned gases pass and has a deflecting annular rim with a depending skirt for deflecting the gases with a reversal in direction around the outside of said pipe to remove suspended matter by impingement.

4 Claims, 5 Drawing Figures

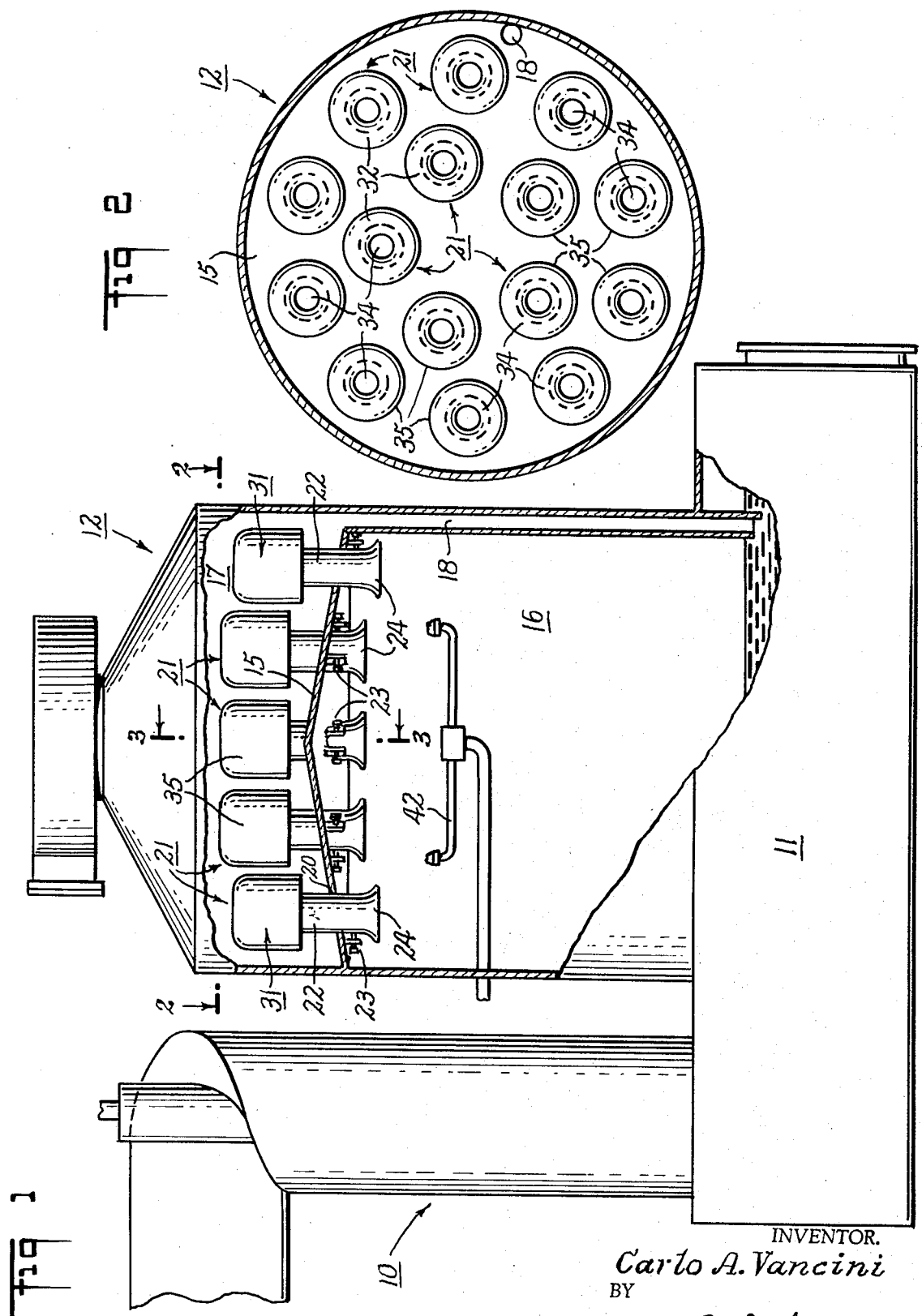

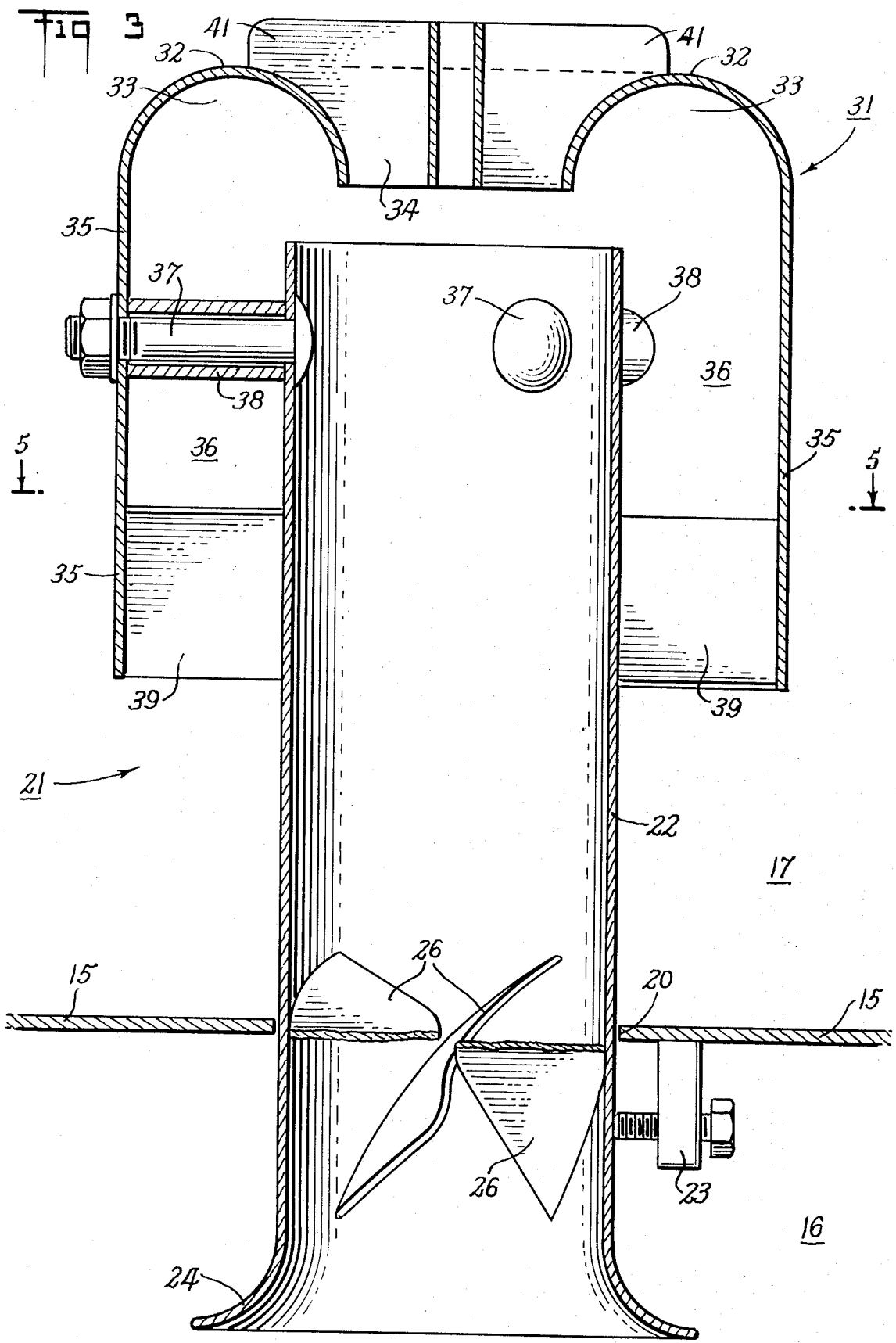

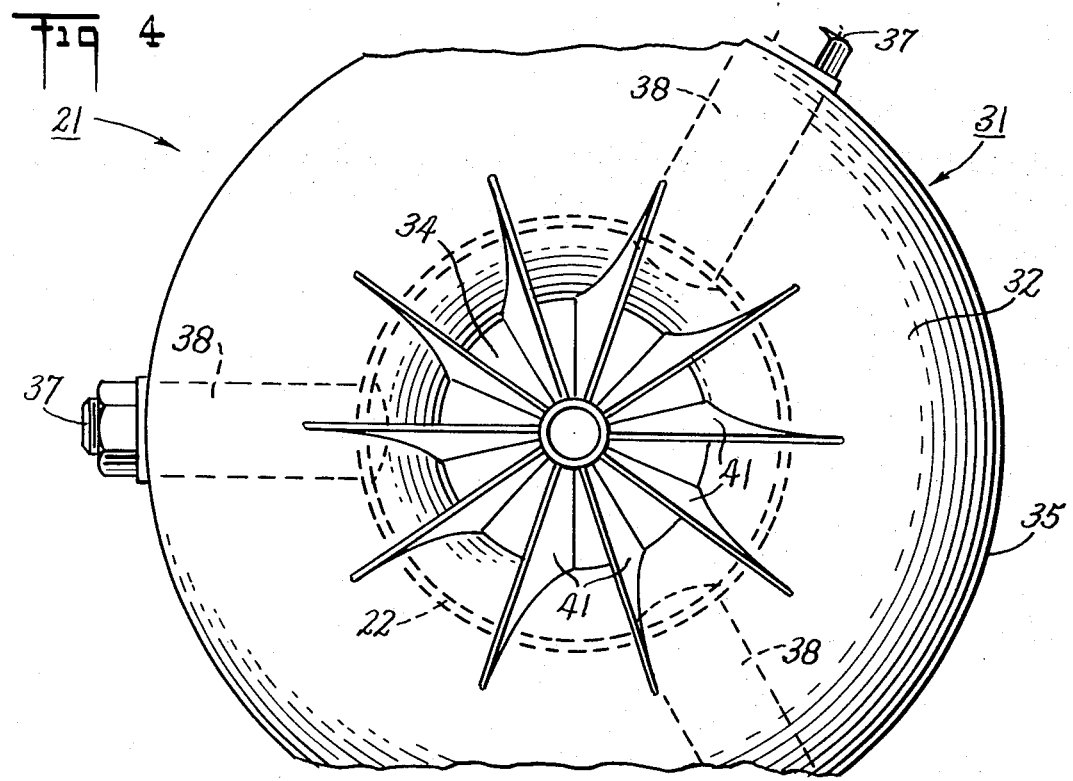
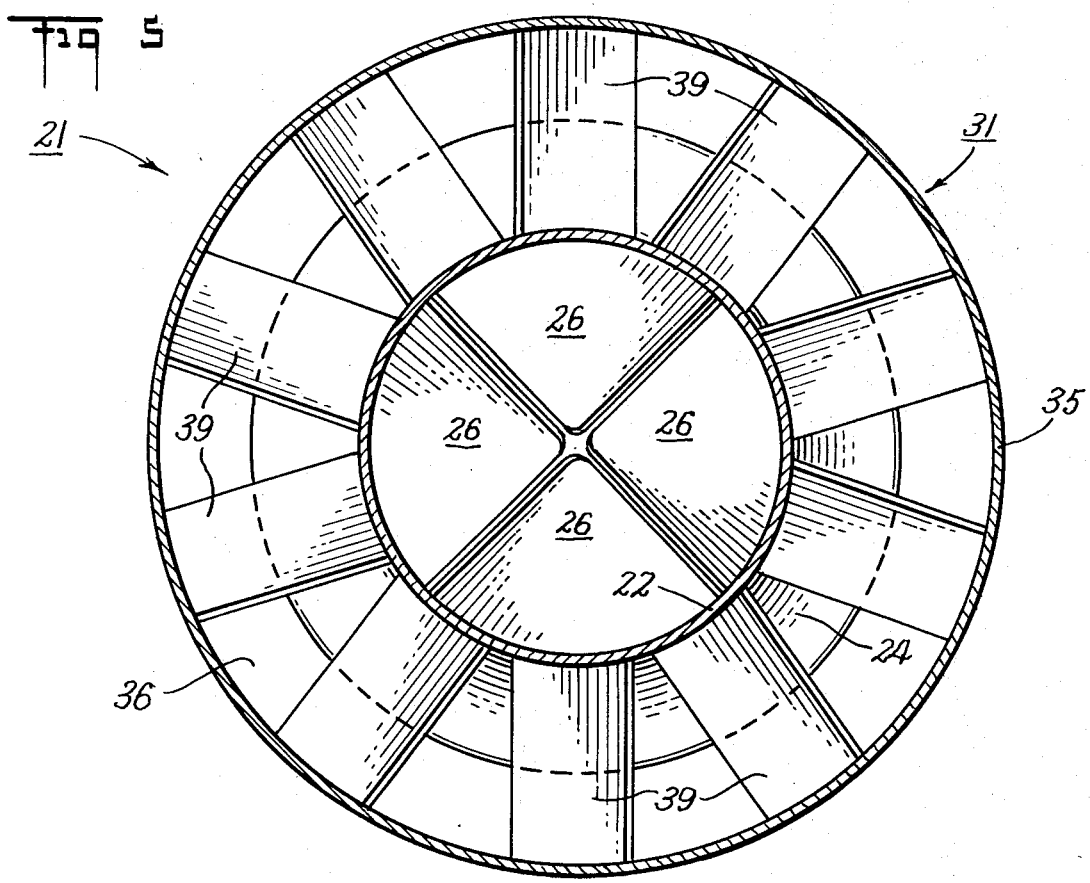

GAS DRYING APPARATUS

This invention relates to gas treating apparatus and more particularly to apparatus for drying or for washing and drying gases for the elimination of entrained particulate matter.

An object is to provide such apparatus for the elimination of entrained moisture or droplets from gases.

Another object is to provide novel and improved apparatus for washing gases for the removal of entrained particles and for removing the droplets to leave the gas in a clean, dry state.

Another object is to provide a novel and improved apparatus of the above type wherein the entrained matter is removed centrifugally due to the rotation of the gas stream with a reversal in direction of gas flow.

Another object is to provide such an apparatus having novel and improved details of construction and features of operation.

Other objects and advantages will be apparent as the nature of the invention is more fully disclosed.

A feature of the invention is the passage of the gas stream along a pipe having fixed vanes to cause rotation of the stream such that the particulate material is separated centrifugally and concentrated in the outer peripheral portions of the gas stream. The cleaned gases at the axis of the pipe are passed to a zone of dry gases while the outer portions of the gas stream are stripped and reversed in direction to remove the droplets by impingement on deflectors. The impingement surfaces may be kept clean by a washing spray.

In cases where the gases are to be washed as well as dried they are first passed through a wash zone wherein they are subjected to a spray of wash liquid and then through a drying zone of the type above described. The washing and drying zones may both be housed in a single vessel or may constitute separate units according to the requirements of a particular case.

The nature of the invention will be better understood from the following description, taken in connection with the accompanying drawings in which a specific embodiment has been set forth for purposes of illustration.

In the drawings:

FIG. 1 is a side elevation illustrating diagrammatically a combination washing and drying apparatus embodying the invention;

FIG. 2 is a transverse section taken on the line 2—2 of FIG. 1 showing the arrangement of the drying units on a baffle plate;

FIG. 3 is a partial vertical section taken on the line 3—3 of FIG. 1, but on a larger scale, showing the construction of a drying unit;

FIG. 4 is a plan view of the unit of FIG. 3; and

FIG. 5 is a transverse section taken on the line 5—5 of FIG. 3 showing the position of the vanes.

Referring to the drawings more in detail, the apparatus is shown in FIG. 1 as comprising a washing vessel 10, a reservoir 11, and a drying vessel 12. For the purposes of this invention the washing vessel 10 may be of any known construction adapted to pass a stream of gases for cleaning through a liquid spray wherein suspended particles are entrained or agglomerated in the spray liquid which is drained into the reservoir 11 and removed while the cleaned gases are passed into the drying vessel 12 for the removal of any entrained droplets of the spray liquid. The liquid and entrained matter may be removed from the reservoir by any suitable means not shown.

The drying vessel 12, according to the invention, includes a transverse baffle plate 15 dividing the vessel into a lower compartment 16 into which the incoming gases are received for treatment, and an upper compartment 17 into which the dried gases are passed.

The baffle plate 15 is shown as slightly coned upwardly at the center for drainage and the liquid thereon is drained into the reservoir 11 by one or more pipes 18 disposed around the periphery of the plate 15.

The plate 15 is shown as having a series of holes 20 which may be arranged in concentric circles or may be otherwise disposed according to the size and shape of the vessel. Each hole 20 carries a drying unit 21 which is shown in FIGS. 3 to 5 as comprising a central pipe 22 extending through the hole 20 and secured in place by clamps 23 carried on the under side of the plate 15. The pipe 22 is flared outwardly at the bottom as at 24 to facilitate the passage of the gases between the chambers 16 and 17. Within the pipe 22 is a series of vanes 26 arranged to cause rotation of the gases passing through the pipe. This rotation is adapted to concentrate the suspended particles and liquid droplets toward the outer periphery of the gas stream and to leave the gases at the center substantially dry and clean.

Disposed above and over the upper end of the pipe 22 is a cap 31 having a doughnut shaped top 32 forming an annular channel 33 with a central opening 34 for the upward passage of the cleaned gases in the central portion of the stream. The cap 31 has a depending outer skirt 35 which extends around the pipe 22 and is spaced therefrom to form an annular gas passage 36. The cap 31 is attached to the pipe 22 by any suitable means such as bolts 37 and spacers 38. The arrangement is such that the gases in the peripheral portion of the stream impinge on the inner concave surface of the annular channel 33 and are deflected downwardly around the outside of the pipe 22 onto the upper surface of the plate 15. An additional set of vanes 39 is shown as disposed at the discharge end of the annular passage 36. These vanes are disposed to oppose the rotation of the gases received from the annular passage 36 so as to cause the gases to impinge on the plate 15 without substantial rotation and to be again deflected upwardly by said plate. The vanes 39 may, however, be designed to impart any desired amount of rotation to the gases as required for efficient operation.

A third set of vanes 41 is disposed in the central opening 34 of the cap 31 for opposing rotation of the gases passing therethrough and discharging the gases without substantial rotation. These latter vanes, however, may also be designed to impart any desired rotation to the gases for removing any remaining suspended material. A rotating spray 42 may be disposed below the plate 15 for washing the same and for preventing deposited material from collecting on the surfaces of the walls of the unit.

It is to be noted that the liquid is stripped from the gases onto the surfaces of the walls and flows downwardly onto the plate 15 from which it is drained into the reservoir 11. The dried gases are passed from the chamber 17 to atmosphere or are otherwise discharged as desired.

While a single plate 15 has been shown, it is obvious that a series of such plates may be stacked in spaced relationship in the vessel 12 if further drying is required.

Also the number and arrangement of the units 21 may be varied in successive plates. The rotating spray 42 may be omitted if not required in any particular instance.

This system has the advantage that the units include no moving parts which might require service. Also they are readily removable for cleaning or replacement and may be designed for efficient use in any particular installation.

Although certain specific examples have been shown and described, it is to be understood that various changes and modifications may be made as will be apparent to a person skilled in the art. The invention is to be restricted only in accordance with the scope of the following claims.

I claim:

1. Apparatus for removing suspended matter from gases comprising a vessel having a transverse baffle plate extending thereacross to form separate input and output zones in said vessel and having openings for the passage of gases between said zones, and separating units disposed in registration with said openings, each such unit comprising a central pipe through which said gas stream passes into said outlet zone, means in said pipe to cause rotation of said gas stream for concentrating said suspended matter centrifugally in the peripheral portion of said stream, a cap disposed above the discharge end of said pipe and having an annular concave surface adapted to deflect the outer peripheral portion of said stream downwardly in a reverse direction around the outer surface of said pipe while retaining their rotation and having a downwardly extending skirt spaced beyond said pipe to form an annular passage for said gases and terminating above said baffle plate to provide an annular discharge opening for said gases to be further deflected by said plate into said output zone, said cap having a central opening through which the central portion of said gas stream passes directly into said output zone, and spray means disposed in advance of said plate.

2. Apparatus as set forth in claim 1 including means in said annular passage for opposing rotation of said gas stream whereby said gases are caused to impinge on said baffle plate without substantial rotation.

3. Apparatus according to claim 1 in which said cap includes in its central opening means for opposing rotation of the gases passing therethrough.

4. Apparatus according to claim 1 wherein said spray means is directed to supply wash liquid to the units for preventing accumulation of separated suspended matter thereon.

* * * * *